US012573953B2

(12) United States Patent
Chiu

(10) Patent No.: US 12,573,953 B2
(45) Date of Patent: Mar. 10, 2026

(54) SWITCHING REGULATOR WITH PULSE FREQUENCY MODULATION CONTROL AND MODE TRANSITION

(71) Applicant: Realtek Semiconductor Corp., HsinChu (TW)

(72) Inventor: Chien-Hao Chiu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 178 days.

(21) Appl. No.: 18/433,455

(22) Filed: Feb. 6, 2024

(65) Prior Publication Data

US 2024/0275284 A1    Aug. 15, 2024

(30) Foreign Application Priority Data

Feb. 13, 2023    (TW) .................................. 112105001

(51) Int. Cl.
*H02M 1/14* (2006.01)
*H02M 3/158* (2006.01)
(52) U.S. Cl.
CPC ............. *H02M 3/158* (2013.01); *H02M 1/14* (2013.01)
(58) Field of Classification Search
CPC ................................. H02M 3/158; H02M 1/14
See application file for complete search history.

(56) References Cited

U.S. PATENT DOCUMENTS

| | | | |
|---|---|---|---|
| 5,745,352 A | 4/1998 | Sandri et al. | |
| 10,483,849 B1* | 11/2019 | Saleem | H02M 3/1584 |
| 10,498,237 B1* | 12/2019 | Lin | H02M 3/158 |
| 2010/0320983 A1* | 12/2010 | Wu | H02M 3/156 323/283 |
| 2012/0153919 A1* | 6/2012 | Garbossa | H02M 3/156 323/284 |
| 2015/0091544 A1* | 4/2015 | Jayaraj | H02M 3/156 323/284 |
| 2021/0376729 A1* | 12/2021 | Lee | H02M 1/0025 |
| 2024/0176374 A1* | 5/2024 | Kim | G05F 1/56 |

FOREIGN PATENT DOCUMENTS

TW          I362817          4/2012

* cited by examiner

*Primary Examiner* — Sisay G Tiku
(74) *Attorney, Agent, or Firm* — Winston Hsu

(57) ABSTRACT

A switching regulator is arranged to receive an input voltage to generate an output voltage, and includes an inductor, a mode selection circuit, a multiplexer, and a driving circuit. The mode selection circuit is arranged to generate a selection signal, wherein the selection signal indicates whether the switching regulator operates in a PWM mode or a PFM mode. The multiplexer is arranged to output a PWM signal or a PFM signal according to the selection signal. The driving circuit is arranged to generate a driving signal according to the PWM/PFM signal to control switches in the switching regulator. In response to the switching regulator operating in the PFM mode, an energy storage time of the inductor in one cycle of the PFM signal is generated according to a period length of the PWM signal.

9 Claims, 3 Drawing Sheets

SWITCHING REGULATOR WITH PULSE FREQUENCY MODULATION CONTROL AND MODE TRANSITION

BACKGROUND OF THE INVENTION

1. Field of the Invention

The present invention is related to a switching regulator, and more particularly, to a switching regulator that can effectively reduce an output voltage ripple as well as allowing the switching regulator to be more flexible in inductor selection.

2. Description of the Prior Art

In order to meet power saving and power consumption requirements of portable devices, buck switching regulators play an important role. A buck switching regulator with better stability and transient power supply speed needs to operate at a higher switching frequency (e.g., 1 MHz-2 MHz) to match a size of an inductor commonly used in the portable devices as well as minimizing voltage ripples caused by the inductor during switching between charge and discharge processes. An operating mode at a fixed switching frequency can be referred to as a pulse width modulation (PWM) mode, which can reduce battery power consumption when the portable device consumes a lot of power.

Under a condition that a portable device has a lower power consumption (for example, when a system of the portable device enters a sleeping mode or a standby mode), the buck switching regulator adopting the PWM mode with a higher switching frequency will have a negative impact on the battery power consumption. As a result, the buck switching regulator may switch to a pulse frequency modulation (PFM) mode which can reduce the switching frequency and therefore improve the usage time and life of the battery.

The buck switching regulator adopting the PFM mode will have several problems, however. Firstly, in order to meet power saving requirements in the PFM mode and increase a hysteresis range between the PWM mode and the PFM mode, an overcurrent protection (OCP) of the inductor current is usually set to a relatively high value. This approach will cause an output voltage of the buck switching regulator to have a larger ripple. Secondly, since methods of calculating the inductor current are different in the PWM mode and the PFM mode, frequent switching between the PWM mode and the PFM mode will cause the output voltage ripple to be unstable. Thirdly, a determination to switch from the PFM mode to the PWM mode is made by detecting whether the output voltage of the buck switching regulator is lower than a critical value (i.e., the regulator will switch to the PWM mode after the load current/output voltage reaches a certain level). Since, however, the output voltage undergoes a considerable voltage drop before the PWM mode is entered, a transient response speed and disturbance amount (undershoot/drop) of the output voltage will be affected. Fourthly, in order to stabilize the output voltage of the buck switching regulator and prevent the charging slope of the inductor current from being too high and prevent triggering the overcurrent protection mechanism, the buck switching regulator cannot use an inductor with an inductance value that is too small.

SUMMARY OF THE INVENTION

It is therefore one of the objectives of the present invention to provide a switching regulator that can effectively reduce the output voltage ripple as well as allowing the switching regulator to be more flexible in inductor selection, to address the above-mentioned issues.

According to an embodiment of the present invention, a switching regulator is provided. The switching regulator is arranged to receive an input voltage and generate an output voltage, and comprises a first switch, a second switch, an inductor, a mode selection circuit, a multiplexer, and a driving circuit. The first switch is coupled between the input voltage and a first terminal. The second switch is coupled between the first terminal and a ground voltage. The inductor is coupled to the first terminal, and is arranged to generate the output voltage. The mode selection circuit is arranged to generate a selection signal, wherein the selection signal indicates whether the switching regulator operates in a pulse width modulation (PWM) mode or a pulse frequency modulation (PFM) mode. The multiplexer is arranged to output a PWM signal or a PFM signal according to the selection signal. The driving circuit is coupled to the multiplexer, and is arranged to generate a driving signal according to the PWM signal or the PFM signal to control the first switch and the second switch. In response to the switching regulator operating in the PFM mode, the PFM signal is generated by a PFM signal generating circuit, and an energy storage time of the inductor in one cycle of the PFM signal is generated according to a period length of the PWM signal.

According to an embodiment of the present invention, a switching regulator is provided. The switching regulator is arranged to receive an input voltage and generate an output voltage, and comprises a first switch, a second switch, an inductor, a mode selection circuit, a multiplexer, and a driving circuit. The first switch is coupled between the input voltage and a first terminal. The second switch is coupled between the first terminal and a ground voltage. The inductor is coupled to the first terminal, and is arranged to generate the output voltage. The mode selection circuit is arranged to generate a selection signal, wherein the selection signal indicates whether the switching regulator operates in a PWM mode or a PFM mode. The multiplexer is arranged to output a PWM signal or a PFM signal according to the selection signal. The driving circuit is coupled to the multiplexer, and is arranged to generate a driving signal according to the PWM signal or the PFM signal to control the first switch and the second switch. In response to the switching regulator operating in the PFM mode, after an energy storage time of the inductor in one cycle of the PFM signal ends, the mode selection circuit determines whether an inductor current of the inductor triggers a zero crossing. In response to the mode selection circuit determining that the inductor current does not trigger the zero crossing in multiple consecutive cycles of the PFM signal, the switching regulator switches from the PFM mode to the PWM mode, and the mode selection circuit generates the selection signal to control the multiplexer to output the PWM signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
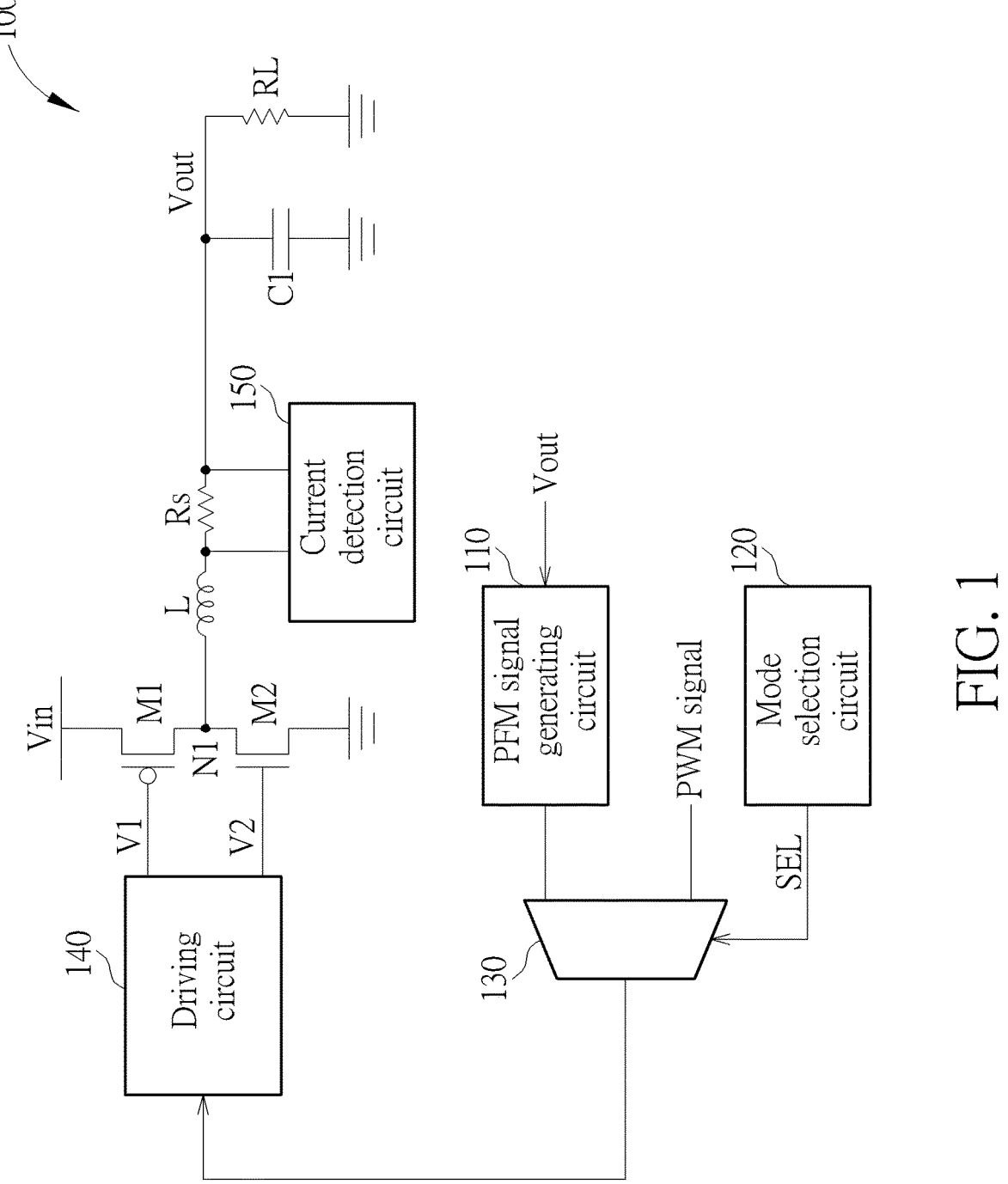
FIG. 1 is a diagram illustrating a switching regulator according to an embodiment of the present invention.

FIG. 1 is a diagram illustrating a switching regulator 100 according to an embodiment of the present invention, wherein the switching regulator 100 may be arranged to receive an input voltage Vin and generate an output voltage Vout. As shown in FIG. 1, the switching regulator 100 may include a pulse frequency modulation (PFM) signal generating circuit 110, a mode selection circuit 120, a multiplexer (MUX) 130, a driving circuit 140, a current detection circuit 150, a first switch implemented by a transistor M1, a second switch implemented by a transistor M2, an inductor L, a sensing resistor Rs, a capacitor C1, and a load RL. In this embodiment, the transistor M1 is a P-type transistor, wherein a source terminal of the transistor M1 is coupled to the input voltage Vin, and a drain terminal the transistor M1 is coupled to a node N1. The transistor M2 is an N-type transistor, wherein a drain terminal of the transistor M2 is coupled to the node N1, and a source terminal of the transistor M2 is coupled to a ground voltage. The inductor L is coupled to the node N1. The sensing resistor Rs is connected in series with the inductor L, and is used for the current detection circuit 150 to detect a flowing current (e.g., an inductor current). The capacitor C1 and the load RL is coupled between the output voltage Vout and the ground voltage.

The mode selection circuit 120 may be arranged to determine whether the switching regulator 100 currently needs to adopt a pulse width modulation (PWM) mode or a PFM mode, in order to generate a selection signal SEL to the MUX 130. For example, in response to the selection signal SEL indicating the PFM mode, the MUX 130 will select to output the PFM signal. In response to the selection signal SEL indicating the PWM mode, the MUX 130 will select to output the PWM signal. The driving circuit 140 may generate driving signals V1 and V2 according to the PWM signal or the PFM signal output by the MUX 130, to control the transistors M1 and M2. In response to the transistor M1 being enabled, the inductor current flowing through the inductor L and the output voltage Vout will be increased. In response to the transistor M2 being enabled, the inductor current flowing through the inductor L and the output voltage Vout will be decreased. The transistors M1 and M2 are not enabled at the same time.

The conventional switching regulator will suffer from the output voltage ripple problem and the inductor selection problem. To address these issues, the present invention provides the PFM signal generating circuit 110 and the mode selection circuit 120. The PFM signal generating circuit 110 is designed by considering a period/frequency of the PWM signal, so that there is a small difference in ripples of the inductor current or the output voltage Vout when the switching regulator 100 switches between the PFM mode and the PWM mode, and there is no need to adopt a higher over-current protection (OCP) mechanism to further reduce the output voltage ripple. In addition, since using an inductor L with a smaller inductance value that causes the ripple of the output voltage Vout to increase under a higher OCP mechanism and reach the OCP design value quickly (which will affect the efficiency) is not a concern, the selection of the inductor L can be more flexible. Furthermore, the mode selection circuit 120 determines whether to perform the mode switching according to whether the inductor current triggers a zero crossing, but not according to the level of the output voltage Vout. As a result, the undershoot/drop of the output voltage Vout can be reduced to avoid affecting the transient response speed of the switching regulator 100.

It should be noted that, since the PWM mode of the switching regulator 100 and generation of the PWM signal are well known to those skilled in the art, and the focus of the present invention is on the PFM mode and the trigger mechanism for switching from the PFM mode to the PWM mode, details of the PWM mode are omitted here.

Figure 2:
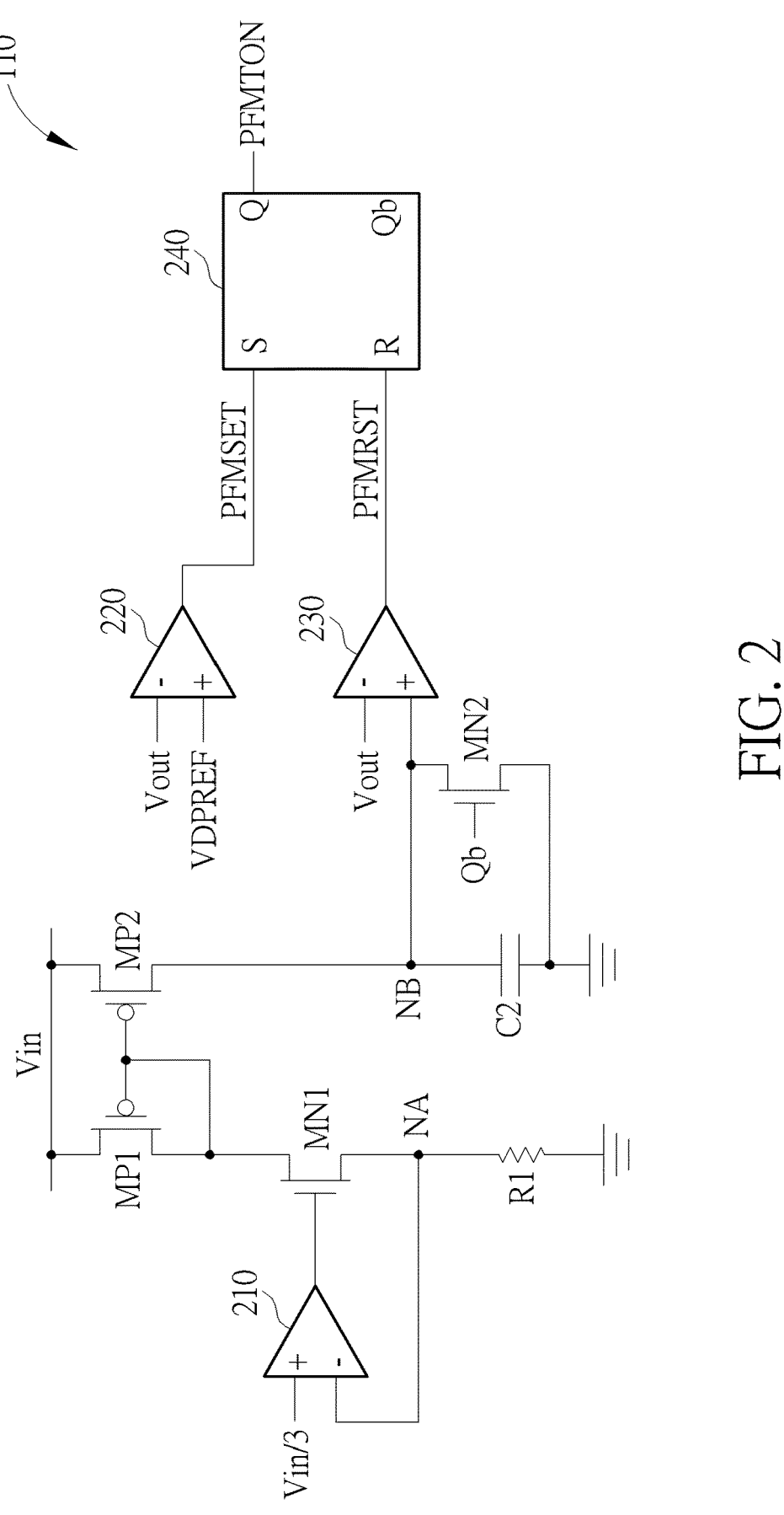
FIG. 2 is a diagram illustrating a PFM signal generating circuit according to an embodiment of the present invention.

FIG. 2 is a diagram illustrating a PFM signal generating circuit 110 according to an embodiment of the present invention. As shown in FIG. 2, the PFM signal generating circuit 110 may include an operational amplifier 210, P-type transistors MP1 and MP2, N-type transistors MN1 and MN2, a resistor R1, a capacitor C2, comparators 220 and 230, and an enabling signal generating circuit (which may be implemented by a flip-flop 240). In this embodiment, an input terminal of the operational amplifier 210 is coupled to a divided voltage of the input voltage Vin (e.g., Vin/3), another input terminal of the operational amplifier 210 is coupled to a node NA, and an output terminal of the operational amplifier 210 is coupled to a gate terminal of the N-type transistor MN1. A source terminal of the P-type transistor MP1 is coupled to the input voltage Vin, and a drain terminal of the P-type transistor MP1 is coupled to a drain terminal of the N-type transistor MN1. A source terminal of the N-type transistor MN1 is coupled to the node NA. The resistor R1 is coupled between the node NA and the ground voltage. A source terminal of the P-type transistor MP2 is coupled to the input voltage Vin, a drain terminal of the P-type transistor MP2 is coupled to a node NB, and a gate terminal of the P-type transistor MP2 is coupled to a gate terminal of the P-type transistor MP1. The capacitor C2 is coupled between the node NB and the ground voltage. A drain terminal of the N-type transistor MN2 is coupled to the node NB, and a source terminal of the N-type transistor MN2 is coupled to the ground voltage. The comparator 220 may be arranged to compare the output voltage Vout with a reference voltage VDPREF to generate a comparison result PFMSET. The comparator 230 may be arranged to compare the output voltage Vout with a voltage on the node NB to generate a comparison result PFMRST. The flip-flop 240 may use the comparison result PFMSET as a set signal and use the comparison result PFMRST as a reset signal to generate an enabling signal PFMTON, wherein the enabling signal PFMTON can act as the PFM signal output by the PFM signal generating circuit 110.

In detail, in response to the switching regulator 110 entering the PFM mode, the comparator 220 may compare the output voltage Vout and the reference voltage VDPREF to generate the comparison result PFMSET. In response to the output voltage Vout being higher than the reference voltage VDPREF, the comparison result PEMSET is at a low voltage level (i.e., a logical value "0").

In response to the output voltage Vout being lower (e.g., not higher) than the reference voltage VDPREF, the comparison result PFMSET is at a high voltage level (i.e., a logical value "1") to indicate that the output voltage Vout is lower than the reference voltage VDPREF. At this moment, if the output voltage Vout is reduced to be lower than the reference voltage VDPREF so that the comparison result PFMSET is "1", an output (Q) of the flip-flop 240 will also be "1". The enabling signal PFMTON (i.e., the PFM signal) being "1" starts to be in an enabling state, and the enabling signal PFMTON may be transmitted to the driving circuit 140 through the MUX 130, so that the driving circuit 140 may generate the driving signal V1 to enable the transistor M1 to start storing energy for the inductor L (i.e., the inductor current may be increased). In addition, the driving circuit 140 may also generate the driving signal V2 to disable the transistor M2. Simultaneously, another output (Qb) of the flip-flop 240 is "0". As a result, the N-type transistor MN2 will be in a disabling state, and the capacitor C2 can be charged through a current source composed of the operational amplifier 210, the resistor R1, the N-type transistor MN1, and the P-type transistors MP1 and MP2.

In addition, since the voltage level of the node NA will be locked at (Vin/3) due to the operational amplifier 210, a fixed current generated by the above-mentioned current source is (Vin/3*R1). As the capacitor C2 continues to charge, the voltage level of the node NB will also increase. In response to the voltage level of the node NB being higher than the output voltage Vout, the comparison result PFMRST generated by the comparator 230 may change from the low voltage level to the high voltage level (i.e., the comparison result PFMRST may switch from "0" to "1" to indicate that the voltage level of the node NB is higher than the output voltage Vout). In response to the comparison result PEMRST switching from "O" to "1", the output (Q) of the flip-flop 240 may be reset as "0". At this moment, the enabling signal PFMTON (i.e., the PFM signal) is "O" and starts to be in a disabling state, and the enabling signal PENTON may be transmitted to the driving circuit 140 through the MUX 130 so that the driving circuit 140 may generate the driving signal V1 for disabling the transistor M1 and generate the driving signal V2 for enabling the transistor M2, to start releasing the energy for the inductor L such that energy storage of the inductor L is ended in this cycle. Simultaneously, another output (Qb) of the flip-flop 240 is "1" to enable the N-type transistor MN2 and discharge the voltage level of the node NB to the ground voltage, so that the energy storage of the inductor L begins in a next inductor storage cycle.

In the above operations of the PFM signal generating circuit 110, an inductor energy storage time TON_PFM (i.e., the time when the enabling signal PFMTON is "1") for one cycle (or a PFM period) can be represented as follows:

$$(Vin/3*R1)*TON\_PFM = C2*Vout; \qquad (1)$$

Wherein the equation (1) can also be represented as:

$$TON\_PFM = (3*R1*C2)*(Vout/Vin). \qquad (2)$$

Under a condition that a signal frequency and a signal period in the PWM mode are known, "3*R1*C2" in the equation (2) can be designed to be equal to a signal period Ts in the PWM mode, so that the inductor energy storage time TON_PFM can be equal to Ts*(Vout/Vin), wherein "Ts*(Vout/Vin)" is an inductor energy storage time in the PWM mode.

By generating an energy storage time of the inductor L in one cycle of the PFM signal according to a period length of the PWM signal, the enabling signal PFMTON generated by the PFM signal generating circuit 110 may make the inductor energy storage time of the switching regulator 100 operating in the PFM mode close to that of the switching regulator 100 operating in the PWM mode. As a result, no matter whether the switching regulator 100 operates in the PFM mode or frequently switches between the PFM mode and the PWM mode, the switching regulator 100 can cause the ripple of the output voltage Vout to be as small as the output voltage ripple in the PWM mode for any load current, such that it is hard to detect whether the switching regulator 100 switches between the two modes. In addition, the switching regulator 100 may not need to adopt the higher OCP mechanism to increase the hysteresis range between the PWM mode and the PFM mode, which can reduce the ripple of the output voltage Vout. Additionally, since using an inductor L with a smaller inductance value that causes the ripple of the output voltage Vout to increase under a higher OCP mechanism and affect the efficiency is not a concern, the selection of the inductor L can be more flexible.

It should be noted that the divisor "3" used in the divided voltage (Vin/3) of the input voltage Vin shown in FIG. 2 is for illustration only, and the present invention is not limited thereto. In some embodiments, the divisor "3" shown in FIG. 2 can be replaced by any suitable divisor A of a real number, and "3*R1*C2" in the equation (2) may be correspondingly replaced by "A*R1*C2".

In addition, the circuit architecture shown in FIG. 2 is for illustration only, and the present invention is not limited thereto. The circuit architecture that can control the inductor energy storage time TON_PFM in one cycle as Ts*(Vout/Vin) should fall within the scope of the present invention. For example, the operational amplifier 210, the resistor R1, the N-type transistor MN1, and the P-type transistors MP1 and MP2 shown in FIG. 2 can be replaced by any current source that can generate a current I to charge the capacitor C2, wherein the current I may be equal to "Vin/(A*R1)". In addition, the flip-flop 240 may also be replaced by any enabling signal generating circuit that can generate the enabling signal PEMTON according to the comparison results PFMSET and PFMRST.

In some embodiments, the N-type transistor MN2 can be replaced by any suitable discharging path. For example, the discharging path can discharge the node NB in response to the comparison result PFMRST being equal to "1", to make the voltage level of the terminal NB equal to the ground voltage.

In the PFM mode, after the inductor energy storage time TON_PFM in one cycle ends, in response to the enabling signal PENTON being "0", the mode selection circuit 120 may detect whether a zero crossing (i.e., the inductor current is equal to 0) is triggered by the current detection circuit 150 during the process of releasing energy for the inductor L, in order to determine whether the inductor current is at a low level. In addition, in response to the comparison result PFMSET being "1", the mode selection circuit 120 may determine whether the zero crossing is not triggered in multiple consecutive cycles in which energy is released for the inductor L. If the determination is "Yes", the switching regulator 100 may switch from the PFM mode to the PWM mode, and the mode selection circuit 120 may generate the selection signal SEL to control the MUX 130 to select PWM signal for the driving circuit 140.

Figure 3:
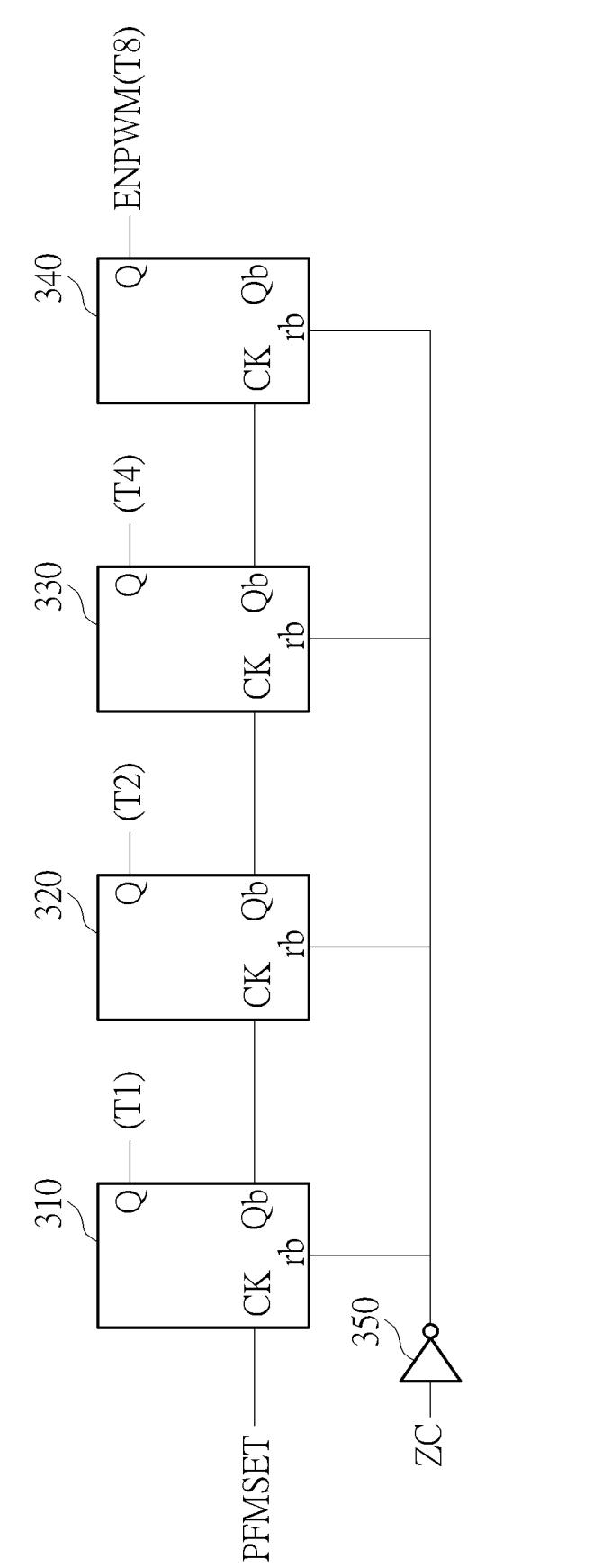
FIG. 3 is a diagram illustrating a mode selection circuit according to an embodiment of the present invention.

FIG. 3 is a diagram illustrating a mode selection circuit 120 according to an embodiment of the present invention. As shown in FIG. 3, the mode selection circuit 120 may include a counter implemented by four flip-flops 310-340 connected in series and an inverter 350. The flip-flop 310 may be arranged to receive the comparison result PFMSET output by the comparator 220, and the flip-flop 340 may be arranged to generate a PWM enabling signal ENPWM.

In the operations of the circuit shown in FIG. 3, as long as the zero crossing is not triggered during the energy releasing process of the inductor L, the flip-flops 310-340 will count sequentially. Once the zero crossing is triggered during the energy releasing process of the inductor L, a control signal ZC will reset the flip-flops 310-340 through the inverter 350, so that the flip-flops 310-340 need to restart counting. In this embodiment, T1, T2, T4, and T8 shown in FIG. 3 may be the 1st, 2nd, 4th, and 8th consecutive cycles in the PFM mode. In response to the zero crossing not being triggered during the energy releasing process of the inductor L for 8 consecutive cycles, the switching regulator 100 may enter a heavy load from a light load in the PFM mode. At this moment, the PWM enabling signal ENPWM may be "1" so that the mode selection circuit 120 may generate the selection signal SEL for controlling the MUX 130 to select the PWM signal for the driving circuit 140.

In this embodiment, since the mode selection circuit 120 determines whether to switch to the PWM mode according to whether a zero crossing is triggered during the process of releasing energy for the inductor L, whereas related art methods need to wait until the output voltage Vout is lower than a critical value before switching to the PWM mode, the present invention can reduce the disturbance amount (undershoot/drop) of the output voltage Vout and thereby prevent affecting the transient response speed of the switching regulator 100.

It should be noted that the embodiment shown in FIG. 3 is for illustration only, and the present invention is not limited thereto. In some embodiments, the flip-flops 310-340 may be replaced by any suitable counter. For example, the mode selection circuit 120 may implemented by various circuit designs, as long as a counter included in the mode selection circuit 120 can count according to the comparison result PFMSET, wherein the counter resets when the zero crossing is triggered by the inductor current; and when a count value of the counter is higher than a predetermined value, the mode selection circuit 120 may determine the zero crossing is not triggered by the inductor current in multiple consecutive cycles of the PFM signal, and therefore generate the selection signal SEL to control the MUX 130 to select the PWM signal for the driving circuit 140.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switching regulator, arranged to receive an input voltage to generate an output voltage, comprising:
   a first switch, coupled between the input voltage and a first terminal;
   a second switch, coupled between the first terminal and a ground voltage;
   an inductor, coupled to the first terminal, and arranged to generate the output voltage;
   a mode selection circuit, arranged to generate a selection signal, wherein the selection signal indicates whether the switching regulator operates in a pulse width modulation (PWM) mode or a pulse frequency modulation (PFM) mode;
   a multiplexer, arranged to output a PWM signal or a PFM signal according to the selection signal; and
   a driving circuit, coupled to the multiplexer, and arranged to generate a driving signal according to the PWM signal or the PFM signal to control the first switch and the second switch;
   wherein in response to the switching regulator operating in the PFM mode, the PFM signal is generated by a PFM signal generating circuit, and an energy storage time of the inductor in one cycle of the PFM signal is generated according to a period length of the PWM signal;
   wherein the energy storage time of the inductor in one cycle of the PFM signal is Ts*(Vout/Vin), wherein Ts is the period length of the PWM signal, Vout is the output voltage, and Vin is the input voltage.

2. The switching regulator of claim 1, wherein the PFM signal generating circuit comprises:
   a first comparator, arranged to compare the output voltage with a reference voltage to generate a first comparison result;
   wherein in response to the switching regulator operating in the PFM mode and the first comparison result indicating that the output voltage is lower than the reference voltage, the PFM signal starts to be in an enabling state so that the driving circuit generates the driving signal to enable the first switch to start storing energy for the inductor.

3. The switching regulator of claim 2, wherein the PFM signal generating circuit further comprises:
   a current source;
   a capacitor, coupled to the current source through a second terminal; and
   a second comparator, arranged to compare the output voltage with a voltage level of the second terminal to generate a second comparison result;
   wherein in response to the switching regulator operating in the PFM mode and the second comparison result indicating that the voltage level of the second terminal is higher than the output voltage, the PFM signal starts to be in a disabling state so that the driving circuit generates the driving signal to enable the second switch to start releasing energy for the inductor.

4. The switching regulator of claim 3, wherein in response to the first comparison result indicating that the output voltage is lower than the reference voltage, the capacitor starts to charge through the current source to increase the voltage level of the second terminal; and in response to the second comparison result indicating that the voltage level of the second terminal is higher than the output voltage, the second terminal discharges through a discharge path so that the voltage level is equal to the ground voltage.

5. The switching regulator of claim 3, wherein a current amount of the current source is (Vin/(A*R)), a capacitance value of the capacitor is C, and a value of (A*R*C) is the period length of the PWM signal.

6. The switching regulator of claim 1, wherein in response to the switching regulator operating in the PFM mode, after the energy storage time of the inductor ends, the mode selection circuit determines whether an inductor current of the inductor triggers a zero crossing; and in response to the mode selection circuit determining that the inductor current does not trigger the zero crossing in multiple consecutive cycles of the PFM signal, the switching regulator switches from the PFM mode to the PWM mode, and the mode selection circuit generates the selection signal to control the multiplexer to output the PWM signal.

7. The switching regulator of claim 6, wherein the PFM signal generating circuit comprises:
   a comparator, arranged to compare the output voltage with a reference voltage to generate a comparison result, wherein in response to the switching regulator operating in the PFM mode and the comparison result indicating that the output voltage is lower than the reference voltage, the PFM signal starts to be in an enabling state so that the driving circuit generates the driving signal to enable the first switch to start storing energy for the inductor; and the mode selection circuit comprises:

a counter, arranged to count according to the compari- son result, wherein the counter is reset in response to the inductor current triggering the zero crossing;

wherein in response to a count value generated by the counter being higher than a predetermined value, the mode selection circuit determines that the inductor current does not trigger the zero crossing in the mul- tiple consecutive cycles of the PFM signal.

8. A switching regulator, arranged to receive an input voltage to generate an output voltage, comprising:

a first switch, coupled between the input voltage and a first terminal;

a second switch, coupled between the first terminal and a ground voltage;

an inductor, coupled to the first terminal, and arranged to generate the output voltage;

a mode selection circuit, arranged to generate a selection signal, wherein the selection signal indicates whether the switching regulator operates in a pulse width modu- lation (PWM) mode or a pulse frequency modulation (PFM) mode;

a multiplexer, arranged to output a PWM signal or a PFM signal according to the selection signal; and a driving circuit, coupled to the multiplexer, and arranged to generate a driving signal according to the PWM signal or the PFM signal to control the first switch and the second switch;

wherein in response to the switching regulator operating in the PFM mode, after an energy storage time of the inductor in one cycle of the PFM signal ends, the mode selection circuit determines whether an inductor cur- rent of the inductor triggers a zero crossing; and in response to the mode selection circuit determining that the inductor current does not trigger the zero crossing in multiple consecutive cycles of the PFM signal, the switching regulator switches from the PFM mode to the PWM mode, and the mode selection circuit generates the selection signal to control the multiplexer to output the PWM signal.

9. The switching regulator of claim 8, wherein in response to the switching regulator operating in the PFM mode, the PFM signal is generated by a PFM signal generating circuit, and the PFM signal generating circuit comprises:

a comparator, arranged to compare the output voltage with a reference voltage to generate a comparison result, wherein in response to the switching regulator operating in the PFM mode and the comparison result indicating that the output voltage is lower than the reference voltage, the PFM signal starts to be in an enabling state so that the driving circuit generates the driving signal to enable the first switch to start storing energy for the inductor; and the mode selection circuit comprises:

a counter, arranged to count according to the compari- son result, wherein the counter is reset in response to the inductor current triggering the zero crossing;

wherein in response to a count value generated by the counter being higher than a predetermined value, the mode selection circuit determines that the inductor current does not trigger the zero crossing in the mul- tiple consecutive cycles of the PFM signal.

* * * * *